Dec. 23, 1952     C. C. HIGGENS     2,622,697
LUBRICATING SYSTEM AND/OR APPARATUS Filed March 2, 1949     7 Sheets-Sheet 1

Inventor:
Cecil Cyprian Higgens,
By:
Pierce, Scheffler & Parker,
Attorneys.

Patented Dec. 23, 1952

2,622,697

UNITED STATES PATENT OFFICE 2,622,697

LUBRICATING SYSTEM AND/OR APPARATUS

Cecil Cyprian Higgens, Doncaster, England

Application March 2, 1949, Serial No. 79,271
In Great Britain March 19, 1948

9 Claims. (Cl. 184—7)

This invention relates to lubricating systems and/or apparatus of the kind comprising distributing devices to which lubricant under pressure is supplied alternately through two feed lines under the control of a change-over valve, each of said devices embodying a valve piston and an impeller piston operating in one direction or the other according to which feed line is in operation for the supply of lubricant under pressure, whereby lubricant is automatically delivered by the action of said impeller piston to a bearing point.

While the invention is of general application to such systems, it is of particular utility in systems wherein the distributing devices are adapted to operate in serial order in such manner that after each device is operated to deliver lubricant to a bearing point, flow of lubricant under pressure is directed to the next distributing device in the series or to a return line.

The present invention has among its objects to provide distributing devices of improved construction for use in such systems, the distributing devices being of simple form and economical in manufacture, and of small size, and being adapted for assembly in groups without external piping to provide an improved lubricating system and/or apparatus embodying such distributing devices. An object is to provide a distributing device for use in lubricating systems and/or apparatus of the type stated, the distributing device having the general form of a rectangular block with parallel flat sides at which inlet and outlet ports open, and valve and impeller pistons movable in cylindrical bores within the block to control the flow of the lubricant through the ports. An object is to provide distributing devices of the above-stated block form which may be assembled side-by-side to form a group occupying a minimum space and with the outlet ports of one block communicating with the inlet ports of an adjacent block, thereby to reduce or eliminate external pipe connections and units in multiple distributing device assemblies. Other objects are to provide, for use in lubricating systems having two feed lines alternately supplied with a lubricant under pressure, distributing devices comprising rectangular blocks within which valve and impeller pistons are movable in cylindrical bores parallel to opposite flat faces of the rectangular blocks, inlet ports at the opposite flat faces and communicating with the opposite ends of the cylindrical bore of the valve piston, outlet ports at the opposite faces and communicating with the cylindrical bore of the impeller piston, the inlet and outlet ports associated with each lubricant feed line being at opposite faces of the respective rectangular blocks, and delivery ports for the discharge of the lubricant to bearings from opposite ends of the cylindrical bore of the impeller piston open at a side or edge of the respective blocks. More specifically, objects are to provide distributing devices of the character stated in which all of the rectangular blocks of an assembly are of identical construction, and apertured spacer plates or gaskets are arranged between adjacent blocks of an assembly to establish appropriate connections between the outlet ports of one block and the inlet ports of the adjacent blocks. Further objects are to provide, for association with one or more distributing devices of the stated block form, end members for connection to lubricant feed and return lines, the end members having ports for communication, without use of pipe connections, with the inlet and outlet ports of the distributing device block or blocks.

The invention is hereinafter described, by way of example, with reference to the accompanying diagrammatic drawings, in which.

In carrying the invention into effect according to one embodiment, the improved lubricating system comprises two feed lines 1, 2 (Fig. 1) connected to a source A of lubricant under pressure by valve means B whereby said feed lines may be placed in communication with the said source A alternately. The source A of lubricant under pressure may comprise a manually or power-operated pump drawing lubricant from a supply vessel C and delivering it through the said valve means B to the feed lines 1, 2 alternately. Alternatively, the lubricant may be maintained under predetermined pressure in the supply vessel C by compressed air or mechanical means.

In one form the invention provides a simple hand-operated centralised lubrication system for all kinds of machinery, in which case a manually-operated pump may be used in conjunction with manually-operated change-over valve means. In another form the invention provides an automatic lubricating system which may be remote controlled, for example, to operate through one complete lubricating cycle only or at timed intervals, or continuously at a predetermined rate of input suitable for the requirements of the points to be lubricated.

Distributing devices, such as D, E, F, G, H, for delivering measured quantities of lubricant to the respective lubricating points are arranged in a group or groups, or otherwise connected in series in two closed circuits or pipe lines in which lubricant under pressure flows from and back to the valve means B alternately in opposite directions; one closed circuit including feed line 1, connecting lines 1' between groups of distributing devices, and a return line 3 from the last distributing device, in the direction of flow of the pressure lubricant in that circuit, to the valve means B. Similarly, the other closed circuit includes feed line 2, connecting line 2', and return line 4. Each closed circuit, when not supplied with lubricant under pressure from valve device B, serves as a relief line for venting lubricant from the valve piston cylinders as the valve pistons are moved therein by pressure lubricant in the other closed circuit.

Figure 2:
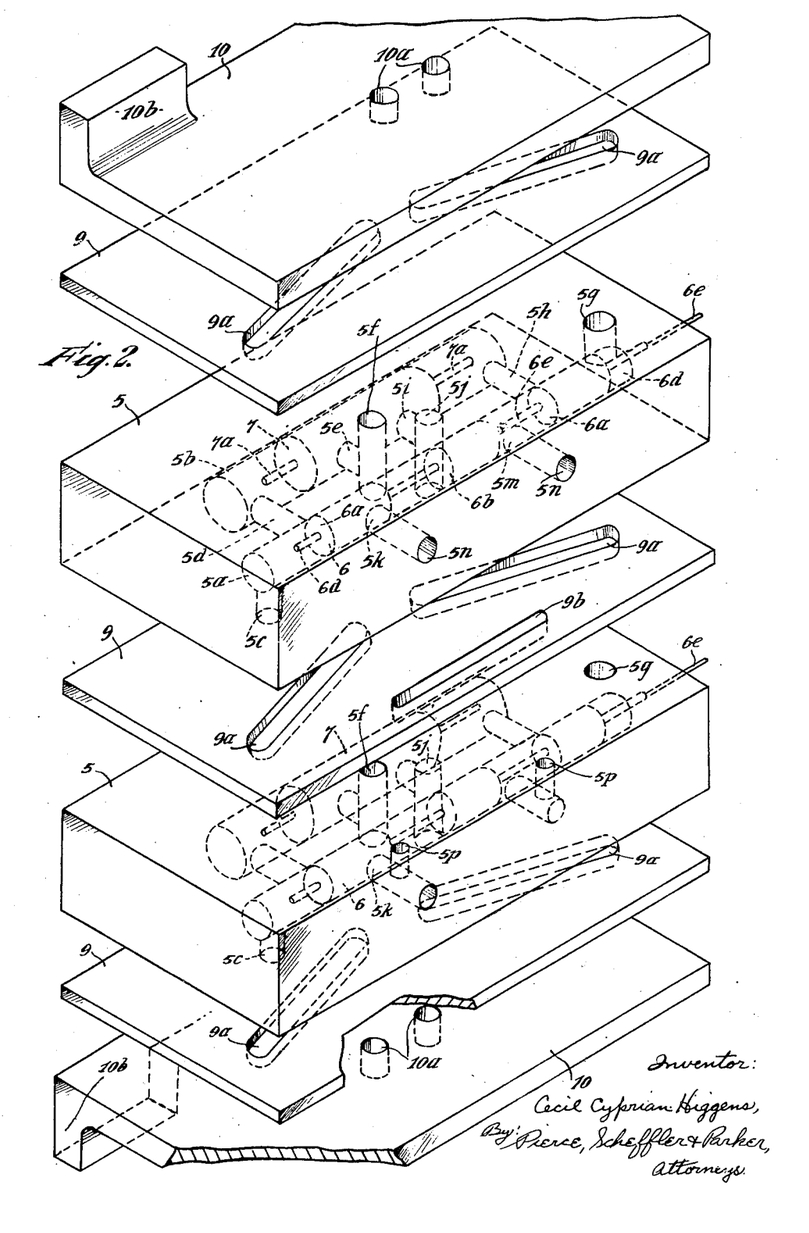
Fig. 2 is a perspective view showing distributing devices according to the invention and illustrating the method of assembling a group thereof by the use of slotted gaskets and end elements.

As shown in Fig. 2, each distributing device may comprise a block 5 faced on the upper and lower sides and having two parallel bores 5a, 5b therein disposed with their axes in a horizontal plane, the bores being closed at the ends by means of end caps or plugs (not shown) to form cylinders, one for a floating valve piston 6 and the other for a floating impeller piston 7. A passage 5c extending from one end of the valve cylinder 5a opens at the lower face of the block 5, and spaced from this end of the valve cylinder 5a is a port controlled by one end of the valve piston 6 and communicating through a passage 5d with the corresponding end of the impeller cylinder 5b. A port 5e displaced from the respective end of the impeller cylinder 5b and controlled by the impeller piston 7 communicates with a passage 5f opening at the upper face of the block 5. Similarly, the opposite end of the valve cylinder 5a communicates with a passage 5g opening at the upper face of the block 5, and a short distance from this end of the valve cylinder 5a a port controlled by the respective end of the valve piston communicates through a passage 5h with the respective end of the impeller cylinder 5b which is provided with a port 5i spaced from the end thereof and controlled by the impeller piston 7, said port 5i communicating with a passage 5j extending downwards and opening at the lower face of the block 5. Thus, at one end the inlet through the port 5c for pressure fluid to the valve cylinder 5a is at the lower face of the block 5 and the respective exit passage 5f from the impeller cylinder 5b is at the upper face, while, in the other case, the inlet passage 5g for pressure fluid is at the upper face of the block 5 and the exit 5j from the impeller cylinder 5b at the lower face, lubricant under pressure alternately supplied to the two inlets 5c, 5g from the respective feed lines 1, 2 therefore passing through the distributing devices D—H in opposite direction.

The valve piston 6 comprises two end parts 6a and an intermediate part 6b connected to the end parts by reduced shank portions 6c. The intermediate part 6b of the piston 6 moves between two lubricant delivery ports 5k, 5m communicating with passages 5n extending to one side face of the block 5 for the connection of delivery pipes 8, 8a (Fig. 3) to the lubricating points. Each end part 6a of the valve piston 6 is of such length that when the piston is at one end of its stroke determined by projecting stops 6d at the end thereof, or on the respective end caps or plugs, the passage 5d (or 5h) at the other end of the valve cylinder 5a communicating with the impeller cylinder 5b is open and in free communication, through the passage 5c or 5g, with the respective feed line 1 or 2, while the other passage 5h (or 5d) communicating with the respective end of the impeller cylinder 5b is open to the annular space surrounding the respective shank portion 6c of the valve piston and is therefore in communication with the respective lubricant delivery passage 5n.

In order to provide for an external indication of the operation of the valve piston 6, the same may be provided at one or each end with a stem 6e (Figs. 2, 3, 4 and 5) projecting through a bore in an end cap sealing the end of the valve cylinder so that when the valve piston 6 is at one extreme end of its stroke, the end of the stem 6e is exposed to view outside the block 5, the end cap incorporating suitable leakage-preventing means. The stem 6e may be protected from damage by a suitable guard projecting from said end cap.

The impeller piston 7 is constituted by a single piston part, the stroke of which is limited by stops 7a projecting therefrom or from end caps or plugs of the cylinder 5b, the arrangement being such that at one end of its stroke, the impeller piston 7 uncovers the outlet 5e or 5i from the opposite end of the cylinder, and vice versa.

Figure 3:
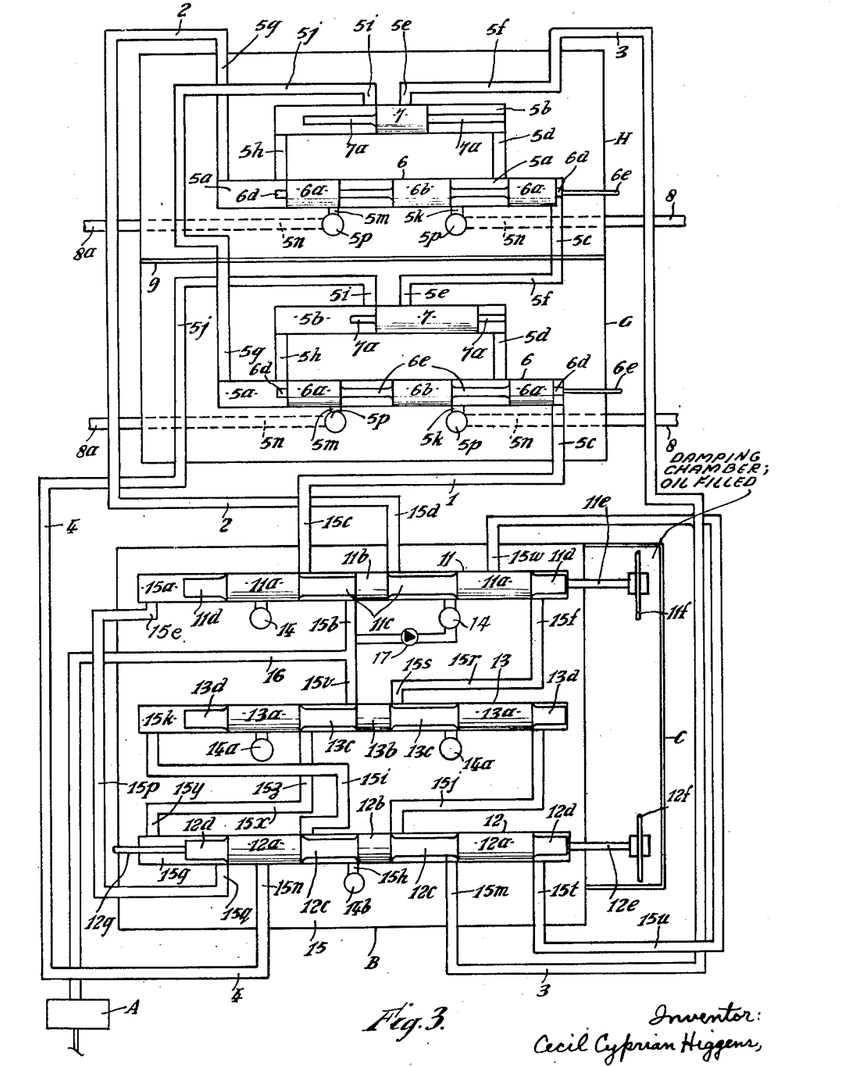
Fig. 3 is a sectional diagram illustrating a group of two distributing devices and automatic change-over valve means, the parts being shown in the positions occupied at the commencement of a cycle of operation.

Adjustment of the delivery of each distributing device may be effected by substituting impeller pistons 7 of different length in conjunction with suitable stops limiting the stroke of the piston so that in one extreme position or the other it just uncovers the respective outlet port 5e, 5i from the impeller cylinder 5b communicating with the respective return line 3, 4. Thus, an impeller piston 7 of short length, as in the unit H of Fig. 3, is utilised in conjunction with comparatively long stops 7a, so as to have a short stroke, while an impeller piston 7 of greater length, as in the unit G of Fig. 3, is used in conjunction with relatively short stops 7a to provide for correspondingly increased stroke and delivery of an increased amount of lubricant.

Any desired number of such distributing devices may be connected together in series. For example, as shown in Fig. 2, two or more of the blocks 5 may be applied one against the other with the interposition between each two adjacent blocks of a spacer plate or gasket 9 provided with slots 9a arranged for the connection of the outlet passage 5f or 5j in the respective face of one block to the inlet passage 5c or 5g in the respective face of the adjacent block so that when one distributing device has operated to deliver lubricant to an associated lubricating point, lubricant under pressure passes through the outlet passage 5f or 5j uncovered by the impeller piston 7 to the respective end of the valve cylinder 5a of the next distributing device for its operation in a similar manner, and so on through the series until finally the lubricant under pressure passes to the return line 3 or 4 of the feed line 1 or 2 which is at the time under pressure. The application of pressure to the return line 3 or 4 in this manner may be caused to operate suitable indicating means showing that the series of distributing devices D—H have completed one cycle of operations, or, in the case of an automatically operating system, the pressure in the return line 3 or 4 is utilised for the operation of change-over valve means whereby lubricant under pressure is automatically directed to the other feed line for operation of the series of distributing devices in reverse order.

It will be understood that each distributing device delivers lubricant alternately to two lubricating points through the pipes 8, 8a (Figs. 1 and 3 to 6). If the machine with which the system is associated has an odd number of lubricating points, or if it should be desirable to lubricate one particular point more frequently, the two lubricant delivery ports 5k, 5m may be connected so that one lubricating point receives lubricant in each direction of travel of the impeller piston 7. For this purpose the spacer plate or gasket 9 associated with the face of the distributing device at which the delivery ports open, may be formed with a slot 9b (Fig. 2) for establishing communication between additional passages 5p opening at one face of the block 5 and communicating with the passages 5n, one of which is closed off at the end while the other is connected to the pipe 8 or 8a. Alternatively, the middle portion 6b of the piston 6 may be reduced in diameter so that the outlets 5d, 5h from the cylinder 5b of the impeller piston 7 may communicate alternately with one of the outlets 5n, the other outlet 5n being sealed off. In this arrangement the ports 5k, 5m are at all times in free communication with the annular space between the end portions 6a of the piston 6.

The inlet and outlet passages 5c, 5f and 5g, 5j in the blocks 5 may be tapped or otherwise adapted for the connection of the feed and return lines 1, 2 and 3, 4 respectively, or of pipes 1', 2' (Fig. 1) extending between individual distributing devices or between groups thereof. Preferably, however, in order to avoid the necessity of tapping the said openings in each block 5, a series thereof assembled with intervening spacer plates or gaskets 9 in the manner described may be completed by terminal elements 10 having openings 10a in one face coinciding with the openings in the respective face of the adjacent distributing device or connected therewith by means of a gasket 9, the openings in the terminal element communicating with tapped fittings (not shown) for the convenient connection of the feed and return lines. The elements 10 may have lugs 10b to facilitate mounting of the assemblage on a suitable base or support.

It will be understood that owing to the arrangement of the valve and impeller cylinders 5a, 5b with their axes in a horizontal plane, the distributing devices can be in the form of blocks 5 of very shallow depth from face to face and, thus, will occupy the minimum of space.

The automatic change-over valve means B may comprise a floating piston valve 11 which controls the connection of the feed lines 1, 2 alternately to the pump A and, through the passages 14 (Figs. 3 to 6), to relief, a second floating piston 12 controlling the connection of the return lines 3, 4 alternately to opposite ends of a cylinder 15k in which a third piston valve 13 operates to control the supply of lubricant under pressure from the pump A to one end or the other of the cylinders 15a, 15g in which the respective piston valves 11 and 12 operate. The piston valves 11, 12 and 13 advantageously are incorporated in a single block or body B.

The first piston valve 11 comprises a floating piston having two end parts 11a and an intermediate part 11b connected by reduced shank portions 11c and also having end stops 11d. The cylinder 15a in which the piston 11 operates has an inlet port 15b for lubricant under pressure at a middle position in its length, said inlet being controlled by the middle part 11b of the piston 11 so that the lubricant under pressure delivered from the pump A through a line 16 to the inlet port 15b may be directed to one or the other of spaced ports 15c, 15d in constant communication with the annular spaces around the said shank portions 11c and leading to the respective feed lines 1, 2. Towards each end of the cylinder 15a an outlet port 15e, 15f communicates, as will be hereinafter described, with a relief return to the reservoir or supply vessel C or, under the control of the piston valve 13, with the supply line 16. The arrangement is such that when one feed line, for instance 1, is in communication with the pump A, the other feed line 2 is in communication with the respective relief passage 14, or vice versa. A pressure relief valve 17 is connected between the supply line 16 and the lubricant reservoir C or, as shown schematically in Figs. 3 to 6, between the supply line 16 and one of the relief passages 14.

The second piston valve 12 comprises a cylinder and piston of substantially the same form as the first valve and having similar parts 12a, 12b, 12c, 12d. The piston valve 12 operates in a cylinder 15g, but in this case the middle port 15h is connected through a relief return passage 14b to the reservoir or supply vessel, which passage 14b, under the control of the middle part 12b of the piston 12, is placed in communication alternately with passages 15i, 15j leading to opposite ends of the cylinder 15k of the piston valve 13. Passages 15m, 15n of the cylinder 15g communicate with the respective return lines 3, 4 and the piston 12 is arranged so that in one extreme position, one return line 3 is connected through the passages 15m and 15j to the respective end of the cylinder 15k, while the other return line 4 communicating with the passage 15n is blocked by the respective part 12a of the piston 12. In the other extreme position of the piston 12 the return line 4 communicates through the passages 15n and 15i with the opposite end of the cylinder 15k and the other return line 3 is blocked by the respective parts 12a of the piston 12.

The third piston valve 13 is similar to the pistons 11 and 12 and is provided with similar parts 13a, 13b, 13c and 13d. A port 15v at a middle position communicates with the supply line 16, this port 15v being controlled by the middle part 13b of the piston 13 whereby lubricant under pressure is directed alternately through a port 15s and passage 15r to the port 15f of the cylinder 15a, or through a port 15z and passage 15x to a port 15y at one end of the cylinder 15g. In addition to the passages 15i, 15j communicating with the ends of the cylinder 15k, intermediate ports are provided to communicate with relief return passages 14a. The outlet port 15e from the cylinder 15a is connected by means of a passage 15p with a port 15q opening into the cylinder 15g. A port 15t at the opposite end of the cylinder 15g communicates through a passage 15u with a port 15w opening into the cylinder 15a. One of the piston valves, preferably the piston valve 12, advantageously is provided with an extension 12g which extends through a bore to the outside of the block 15 through suitable sealing means (not shown) to provide an indication of the operation of the change-over means. Furthermore, if desired, the operation of the piston valves 11 and 12 may be retarded or slowed down by the provision of extensions 11e, 12e on the respective pistons carrying discs 11f, 12f, respectively immersed in lubricant in the supply vessel or reservoir C.

Figure 7:
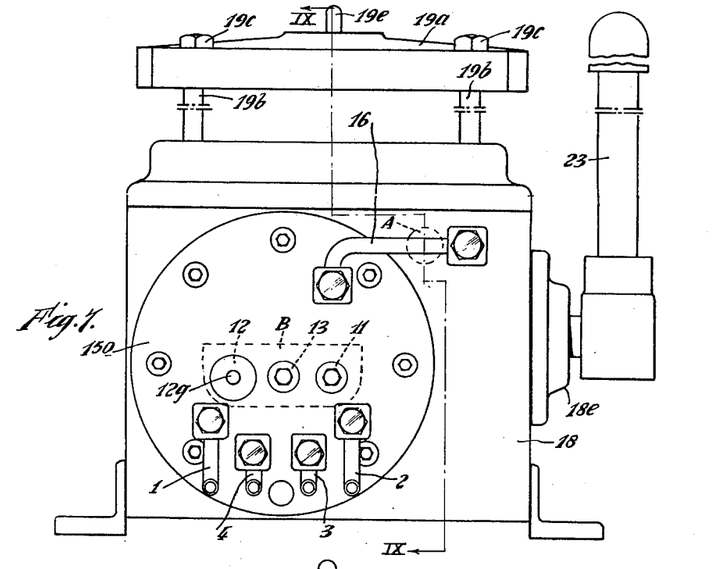
Fig. 7 is a front elevation illustrating a preferred construction of reservoir and pump unit.
Figure 9:
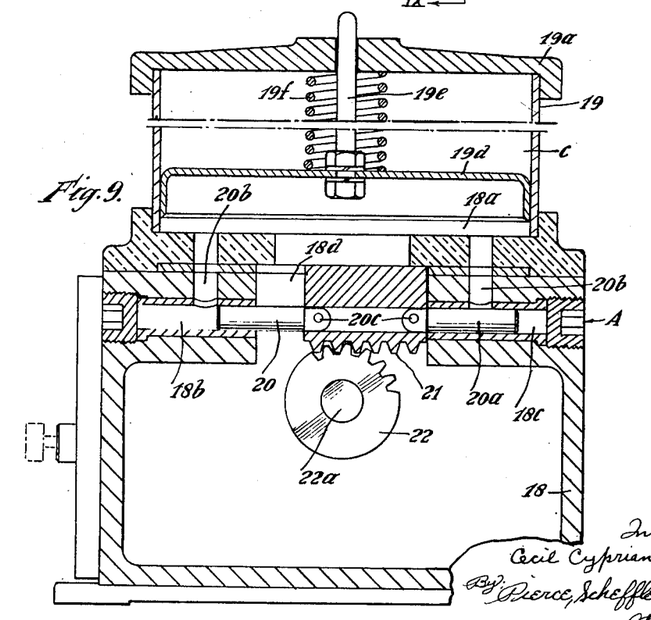
Fig. 9 is a sectional side elevation on the line IX—IX of Fig. 7 showing a preferred construction of lubricant pump.

Any suitable form of pump and lubricant supply unit may be employed. Preferably, as shown in Figs. 7 and 9, a lubricant reservoir is provided in the form of a rectangular box casting 18 housing both the pump A and the changeover valve means B. The casting 18 may have a circular recess 18a at the top for the reception of an interchangeable supply vessel or container C in the form of a cylinder 19 of metal or plastic material. A metal or other cover 19a is fitted on the top of the cylinder 19, and the casting 18, cylinder 19 and cover 19a are held securely together by means such as threaded rods 19b extending through the cover and provided with nuts 19c for clamping the parts together. The cylinder 19 is provided with a plunger 19d mounted on a rod 19e extending through the cover 19a and, particularly in the case of thick lubricant such as grease, a spring 19f may be provided for exerting an initial pressure on the lubricant in the cylinder 19. When the cylinder 19 is empty it may be readily replenished by means of a portable container, the lubricant being transferred by pumping through a suitable non-return coupling device (not shown) in the casting 18.

Figure 8:
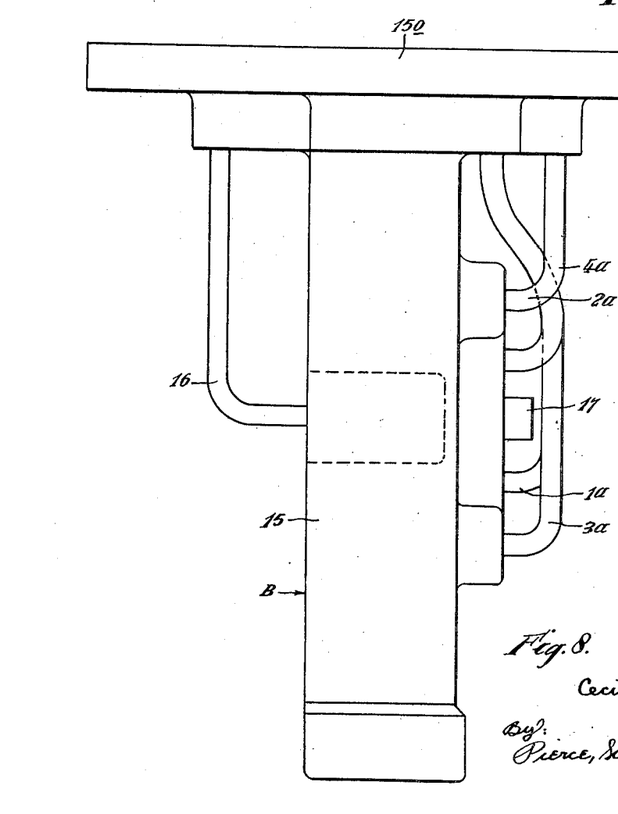
Fig. 8 is a side elevation illustrating a preferred construction of the change-over valve means adapted for fitting into the lubricant reservoir.

As shown more particularly in Fig. 8, the body part 15 of the change-over valve means is provided at one end with a circular flange 15o whereby the change-over valve unit B may be mounted, as shown in Fig. 7, to extend within the casting 18.

Referring to Fig. 8, the connections from the respective ports 15c, 15d, passages 15m, 15n and the supply and return lines 1, 2, 3, 4 are effected by means of external pipes, 1a, 2a, 3a, 4a disposed below the body 15 and communicating with suitably disposed openings in the flange 15o. The relief valve 17 also may extend at the bottom of the body 15. Furthermore, the communicating passages between the respective ports of the change-over valve means may be constituted by external pipe connections at the top of the valve body 15 or may be otherwise arranged, for instance, within the valve body as desired.

As shown in Fig. 9, the pump A preferably is of the double-acting type and comprises two plungers 20, 20a coacting with aligned bores 18b, 18c respectively formed in the base casting 18 and preferably lined with a wear-resisting renewable liner. Inlet ports 20b may be constituted by holes opening directly into the base of the supply cylinder 19. Outlet ports (not shown) at the ends of the bores 18b, 18c communicate through suitable non-return valves with a delivery passage parallel with the bores 18b, 18c and communicating with the delivery pipe line 16 communicating through a suitable fitting in the flange 15o with the appropriate passage in the valve body 15. The pump plungers 20, 20a are adapted for connection, as by means of pins 20c, with a rack element 21 sliding in a slotted plate 18d, the connection between the plungers and the rack element being preferably adapted to accommodate any mal-alignment of the bores 18b, 18c.

The rack element 21 may be reciprocated by a toothed segment 22 keyed to a driving shaft 22a positioned centrally with respect to the two pump bores 18b, 18c and extending through a bearing cap 18e which locates a suitable combination of ball bearings housed within a thickened part of the side wall of the base 18. Alternatively, the bearing cap may itself form a bearing brush. For manual operation a vertically disposed hand lever 23 is keyed to the extending part of the shaft 22a, while, for motor or other power drive, a shorter arm adapted to reciprocating motion would be fitted. The shaft 22a extends through a suitable seal to prevent leakage of lubricant.

The system hereinbefore described operates in the following manner:

Referring to Fig. 3, it will be seen that the output from the pump A communicates through the supply line 16 and the ports 15b and 15c with the feed line 1 from which lubricant under pressure passes through the passage 5c into the right-hand end of the cylinder 5a of the unit G. The piston 6 thereupon moves to the left, thereby placing the passage 5m in communication with the port 5h from the impeller cylinder 5b. During this movement of the piston 6 lubricant trapped in front thereof returns to the reservoir by way of the passage 5g, the passage 5j of the unit H, the port 5i, passage 5h, cylinder 5a through the passage 5g, feed line 2 and port 15d to the right-hand passage 14 in the block 15. The piston 6 of unit G having moved to the left opens the passage 5d leading to the right-hand end of the cylinder 5b, whereupon the piston 7 moves to the left and opens the port 5e communicating with the passage 5f leading to the passage 5c of unit H. The movement of the impeller piston 7 to the left first shuts the port 5i and then forces a measured quantity of lubricant from the cylinder 5b through the passage 5h and port 5m to the pipe 8a leading to a lubricating point.

In a similar manner the piston 6 of the unit H is caused to move to the left to permit of flow of lubricant under pressure through the passage 5d into the right-hand end of the impeller cylinder 5b which is thereby moved to the left so that, after closing the port 5i, a measured quantity of lubricant is forced through the passage 5h and port 5m into the respective delivery pipe 8a of unit H.

Figure 4:
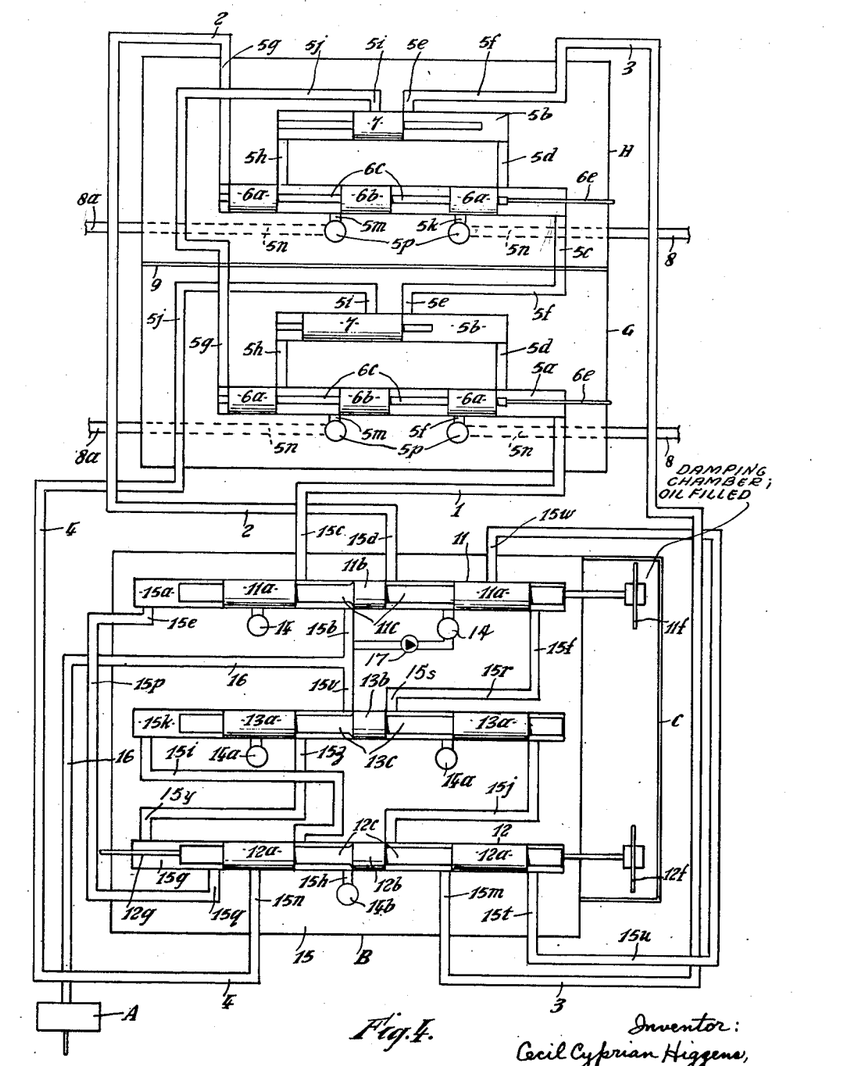
Fig. 4 is a view similar to Fig. 3 showing the positions of the parts after the distributing devices have operated.

The parts are now in the position shown in Fig. 4 and it will be seen that the feed line 1 is in free communication with the return line 3 through the passages 5c, 5d, ports 5e and passages 5f. Furthermore, the return line 4 is blocked by the respective end part 12a of the piston 12.

Referring to Fig. 4, lubricant flowing under pressure through the return line 3 passes through a passage 15m and the passage 15j into the right-hand end of the cylinder 15k. The piston 13 is thereby moved to the left, lubricant trapped in front of the piston 13 returning to the reservoir by way of the passage 15i, port 15h and passage 14b. By this movement of the piston 13, a port 15v communicating with the supply line 16 is placed in communication with a port 15s which communicates, through a passage 15r, with a port 15f opening into the right-hand end of the cylinder 15a. The piston 11 now moves to the left while the lubricant trapped in front thereof escapes into the reservoir by way of the port 15e, passage 15p, ports 15q, 15y and 15z to the respective passage 14a. The movement of the piston 11 to the left also places the port 15b in communication with the port 15d so that lubricant under pressure from the line 16 passes to the feed line 2, while at the same time the feed line 1 connected to the port 15c is placed in communication with the respective passage 14 leading to the reservoir. Movement of the piston 11 to the left also opens a port 15w communicating with a passage 15u leading to the port 15t opening into the right-hand end of the cylinder 15g, whereby the piston 12 is caused to move to the left, whereby placing the return line 4 in communication with the left-hand end of the piston 13 by way of the passages 15n, 15i and at the same time blocking the passage 15m connected to the return line 3.

Figure 5:
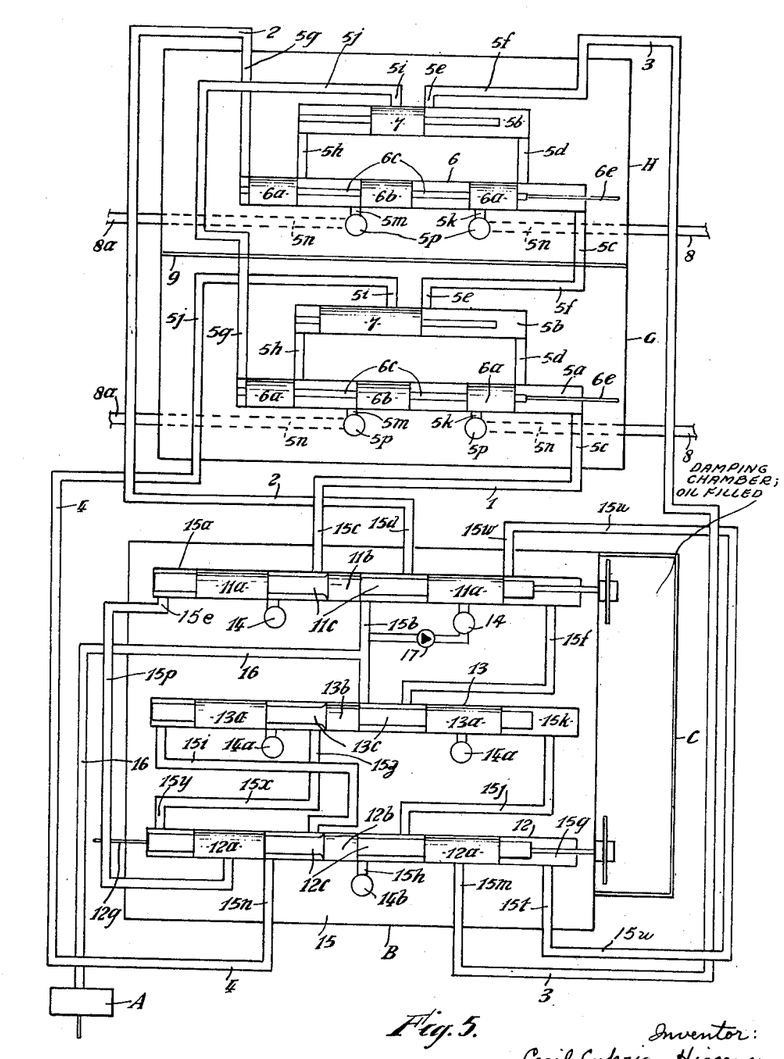
Fig. 5 is a similar view showing the positions of the parts after the change-over valve means has operated for the commencement of flow through the groupt of distributing devices in the reverse direction.

The parts are now in the position shown in Fig. 5 and lubricant under pressure passing through the feed line 2 enters the passage 5g of the unit H, thereby causing movement of the piston 6 to the right and thus opening the passage 5h communicating with the left-hand end of the impeller cylinder 5b. Lubricant trapped in front of the piston 6 returns to the reservoir by way of the passage 5c, the passage 5f and port 5e in the unit G, the passages 5d and 5c, feed line 1 and port 15c, to the respective passage 14. At the same time communication between the passage 5d and the port 5k of unit H is established so that on movement of the impeller piston 7 thereof to the right, a measured quantity of lubricant is discharged from the cylinder 5b to the pipe 8 of unit H leading to a lubricating point. The movement of the impeller piston 7 to the right opens the port 5i so that lubricant under pressure flows through the passage 5j of the unit H to the passage 5g in the unit G leading to the left-hand end of the cylinder 5a in that unit. The piston 6 of unit G is thereby moved to the right, lubricant trapped in front thereof being removed by way of the passage 5c, feed line 1 and port 15c to the passage 14, and on opening of the passage 5h lubricant flows into the left-hand end of the impeller cylinder 5b whereby the piston 7 moves to the right for the discharge of a measured quantity of lubricant through the passage 5d and port 5k to the respective pipe 8 of unit G leading to a lubricating point. The ports 5k, 5m communicate with the pipes 8, 8a respectively through passages 5p, 5n.

Figure 6:
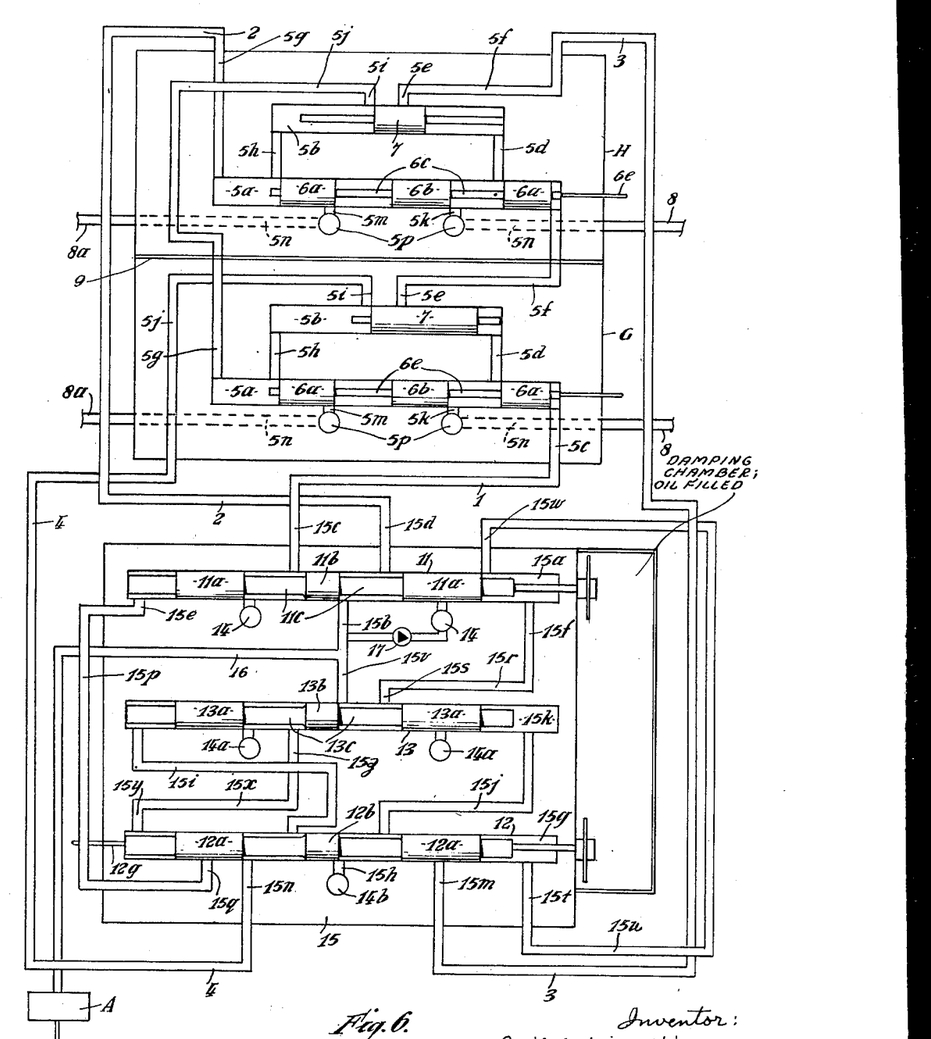
Fig. 6 is a similar view showing the positions of the parts after the distributing devices have operated in reverse order.

The parts are now in the positions shown in Fig. 6, it being understood that the group of distributing devices comprising the units G and H has completed one cycle of operation for the supply of lubricant to four lubricating points. The feed line 2 is now in free communication with the return line 4 by way of the passages 5h, 5j and 5g and thus lubricant under pressure can flow through the passage 15n and passage 15i into the left-hand end of the cylinder 15k, thereby causing the piston 13 to move to the right, during which movement lubricant trapped in front of the piston discharges through the passage 16j to the return passage 14b. This movement of the piston 13 places the port 15v in communication with the port 15z communicating with the passage 15x leading to the port 15y at the left-hand end of the cylinder 15g. At the same time the port 15s communicating with the right-hand end of the cylinder 15a is placed in communication with the respective return passage 14a. The piston 12 thereupon moves to the right, thereby placing the return line 3 in communication with the right-hand end of the cylinder 15k by way of the passages 15m, 15j and at the same time blocking off the passage 15n communicating with the return line 4. Lubricant trapped in front of the piston 12 escapes by way of the port 15t, passage 15u, ports 15w, 15f, passage 15r and port 15s to the respective return passage 14a. The port 15q is now open and the lubricant under pressure passes through the passage 15p to the port 15e leading to the left-hand end of the cylinder 15a, whereby the piston 11 is moved to the right, lubricant trapped in front thereof escaping through the port 15f, passage 15r and port 15s to the respective return passage 14a. This movement of the piston 11 places the port 15c communicating with the feed line 1 in communication with the port 15b leading from the supply line 16 and at the same time places the feed line 2 in communication with the respective return passage 14.

The parts of the change-over valve unit are now in the position shown in Fig. 3 and the distributing units G and H will commence the next cycle of operations for the supply of measured quantities of lubricant to the respective delivery pipes 8 and 8a.

The projecting members 6e of the piston 6 give visual indication of the operation of the units G and H, while the projecting member 12g of the piston 12 gives indication of the proper operation of the change-over valve unit. More particularly in the case of thick grease, the discs 11f, 12f submerged in lubricant in the reservoir or supply vessel C serve to retard the movement of the pistons 11 and 12 to ensure full movement of the piston 13 so that the port 15v controlled thereby will be fully opened at each operation.

It will be noted that the arrangement of the distributing device is such that the outlet passage 5f or 5j from one impeller cylinder to the next distributing device or to the respective return line 3 or 4 is blocked during movement of the impeller piston 7 to close the respective port 5e or 5i and thereafter to deliver lubricant to the respective lubricating point.

Referring, for example, to Fig. 5, it will be seen that when the impeller piston 7 of the unit H moves to the right, the return line connected to the passage 5f and port 5e is blocked by the right-hand end portion 12a of the piston 12. After the unit H has operated and the impeller piston 7 of the unit G moves to the right, the passage 5f is blocked by reason of the fact that the passage 5c in the unit H is closed off by the respective piston 6 which is held in the right-hand position by the pressure of the lubricant on the opposite end thereof.

The apparatus above described is adapted for effective lubrication of a number of points by simple operation of a manual pump, the completion of a cycle of operation being indicated by the projection or retraction of the indicating member 12g. If desired, however, the pump may be power-driven, for example, by an electric motor, or from part of the machine with which the lubricating system is associated, and timing of the operation of the pump or the automatic changeover valve means may be effected in any suitable manner under the control of electrical or mechanical means. Thus, the system may be operated intermittently under the control of a time switch or the like, or may be continuously operated, in which case the pump output is adjusted to suit the lubricating requirements of the machine with which the system is associated.

Figure 1:
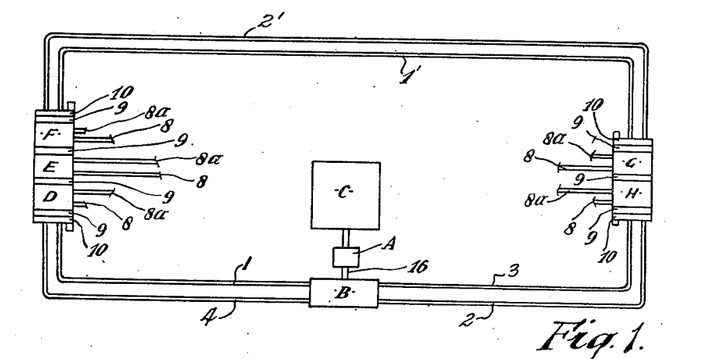
Fig. 1 is a view illustrating the arrangement of a complete lubricating system including distributing devices according to the invention.

It will be understood that the invention is not limited to the particular embodiment hereinbefore described. For example, the distributing devices may be otherwise constructed in any suitable manner. Thus, the connecting passages 9a, 9b (Fig. 2) instead of being formed by slots in the spacer plates or gaskets 9, may be formed in the blocks 5 or bodies of the distributing devices themselves. Furthermore, it will be understood that the series of distributing devices in a system may comprise individual distributing devices or two or more groups thereof connected together in series by suitable pipe connections 1', 2 (as shown in Fig. 1).

I claim:

1. A lubricant distributing device for use in a lubricating system of the type including two feed lines alternately supplied with lubricant under pressure to establish flow of the lubricant alternately in opposite directions through one or more distributing devices and back to a reservoir; said distributing device comprising a block having opposite and parallel surfaces, said block being provided with a pair of bores constituting piston-receiving cylinders, a valve piston and an impeller piston in the respective cylinders, means including an inlet port at each of said opposite surfaces for providing passages for introducing lubricant under pressure into the valve piston cylinder to displace said valve piston in opposite directions according to the feed line which is supplied with lubricant under pressure, an outlet port at each of said opposite surfaces and means providing passages between said cylinders and controlled jointly by said pistons for introducing lubricant under pressure into said impeller piston cylinder to displace the impeller piston as the valve piston approaches each of the end positions and to establish free communication between its inlet port and its associated outlet port at the respective end positions of said impeller piston.

2. A lubricant distributing device as recited in claim 1, wherein the axes of said bores constituting piston-receiving cylinders are parallel to said opposite surfaces of the block.

3. A lubricant distributing device as recited in claim 1, wherein said block is provided with discharge passages for the delivery of lubricant from opposite ends of the impeller piston cylinder to points to be lubricated, said discharge passages terminating at discharge ports at one side of said block.

4. A lubricant distributing device as recited in claim 3, wherein said discharge passages include said passages between said cylinders.

5. A lubricant distributing device as recited in claim 1, wherein one of said pistons is provided with an extension projecting outside of said block at one end position thereof, thereby to afford a visual indication of the operation of said device.

6. A lubricating device as recited in claim 1, in combination with a spacer to be positioned at one face of said block to establish connections to a similar block, said spacer having passages therein for connecting each outlet port of the adjacent surfaces of the blocks to the inlet port of the other block.

7. An assembly of lubricant distributing devices for use in a lubricating system of the type including two feed lines alternately supplied with lubricant under pressure to establish a flow of the lubricant alternately in opposite directions through distributing devices and back to a reservoir; said assembly including a plurality of rectangular blocks of identical design and each provided with a pair of bores constituting cylinders in which are located respectively a valve piston and an impeller piston, inlet ports at opposite parallel surfaces of the respective blocks and communicating with opposite ends of the valve piston cylinder, outlet ports at opposite parallel surfaces of the respective blocks and communicating with spaced ports of the impeller piston cylinder, lubricant distributing outlets at one side of each block and communicating with spaced ports of the valve piston cylinder, and spacer means between adjacent blocks, said spacer means having passages therein for connecting the outlet ports of each of said adjacent blocks to the inlet ports of the other adjacent block.

8. An assembly of lubricant distributing devices as recited in claim 7, in combination with end units at opposite sides of the assembly of blocks, said end units having ports provided with means for connection to feed and return lines, and means providing passages between said ports of the end units and the respective inlet and outlet ports at the outer surfaces of said assembly of blocks.

9. An assembly of lubricant distributing devices as recited in claim 8, wherein said passage-providing means includes spacers between said end units and the block assembly, said spacers having slots therethrough for interconnecting the several ports.

CECIL CYPRIAN HIGGENS.

REFERENCES CITED

The following references are of record in the file of this patent:

UNITED STATES PATENTS

| Number | Name | Date |
| --- | --- | --- |
| 2,007,156 | Burrell | July 9, 1935 |
| 2,105,595 | Hillis | Jan. 18, 1938 |
| 2,141,022 | Rotter | Dec. 20, 1938 |
| 2,206,335 | Rotter | July 2, 1940 |
| 2,260,497 | Whitted | Oct. 28, 1941 |
| 2,440,411 | Leonard | Apr. 27, 1948 |

FOREIGN PATENTS

| Number | Country | Date |
| --- | --- | --- |
| 394,944 | Great Britain | Sept. 28, 1931 |